United States Patent [19]

Sadil et al.

[11] Patent Number: 5,435,124
[45] Date of Patent: Jul. 25, 1995

[54] MOUNTING BRACKET FOR AN AIRCRAFT ENGINE ACCESSORY

[75] Inventors: Andreas Sadil, Wallingford; Stephen A. Sarcich, Vernon, both of Conn.

[73] Assignee: United Technologies Corporation, Hartford, Conn.

[21] Appl. No.: 288,519

[22] Filed: Aug. 10, 1994

[51] Int. Cl.⁶ .......................... F02C 7/20; F16M 1/00
[52] U.S. Cl. .................................. 60/39.31; 60/39.32; 248/220.2; 248/231.4; 248/674
[58] Field of Search ................ 60/39.31, 39.32; 248/220.2, 223.4, 224.2, 231.4, 231.6, 316.4, 316.6, 674

[56] References Cited

U.S. PATENT DOCUMENTS

| | | | |
|---|---|---|---|
| 1,774,267 | 8/1930 | Hanke | 248/231.4 |
| 2,687,860 | 8/1954 | McNitt | 60/39.31 |
| 2,893,676 | 7/1959 | Connors et al. | 248/224.2 |
| 2,978,869 | 4/1961 | Hiscock et al. | 60/39.31 |
| 3,269,118 | 8/1966 | Benedict et al. | 60/39.31 |
| 4,477,047 | 10/1984 | Pelczarski | 248/220.2 |
| 4,892,265 | 1/1990 | Cox | 248/223.4 |
| 5,031,396 | 7/1991 | Margnelli | 60/39.31 |
| 5,249,417 | 10/1993 | Duesler et al. | 60/39.02 |
| 5,288,046 | 2/1994 | Eklof et al. | 248/220.2 |

*Primary Examiner*—Richard A. Bertsch
*Assistant Examiner*—Howard R. Richman
*Attorney, Agent, or Firm*—Kenneth C. Baran

[57] ABSTRACT

A bracket for mounting an accessory on an aircraft engine is disclosed. The bracket includes a mounting wedge (70) adapted to be secured to the engine, a carrier (120) which is supported by the mounting wedge and in turn supports an end of the accessory, and a lock (190) which is retained by the carrier and is longitudinally translatable with respect thereto between a closed position and a range of open positions. With the lock secured in the closed position, notched, inclined supporting and clamping surfaces (76), (90) on the mounting wedge cooperate with ridged, inclined mounting and locking surfaces (132), (200) on the carrier and lock respectively to clamp the carrier to the wedge. With the lock translated to an open position, the carrier can be mounted on or dismounted from the mounting wedge and the wedge can temporarily but reliably support the carrier and therefore an end of an accessory connected to the carrier.

4 Claims, 4 Drawing Sheets

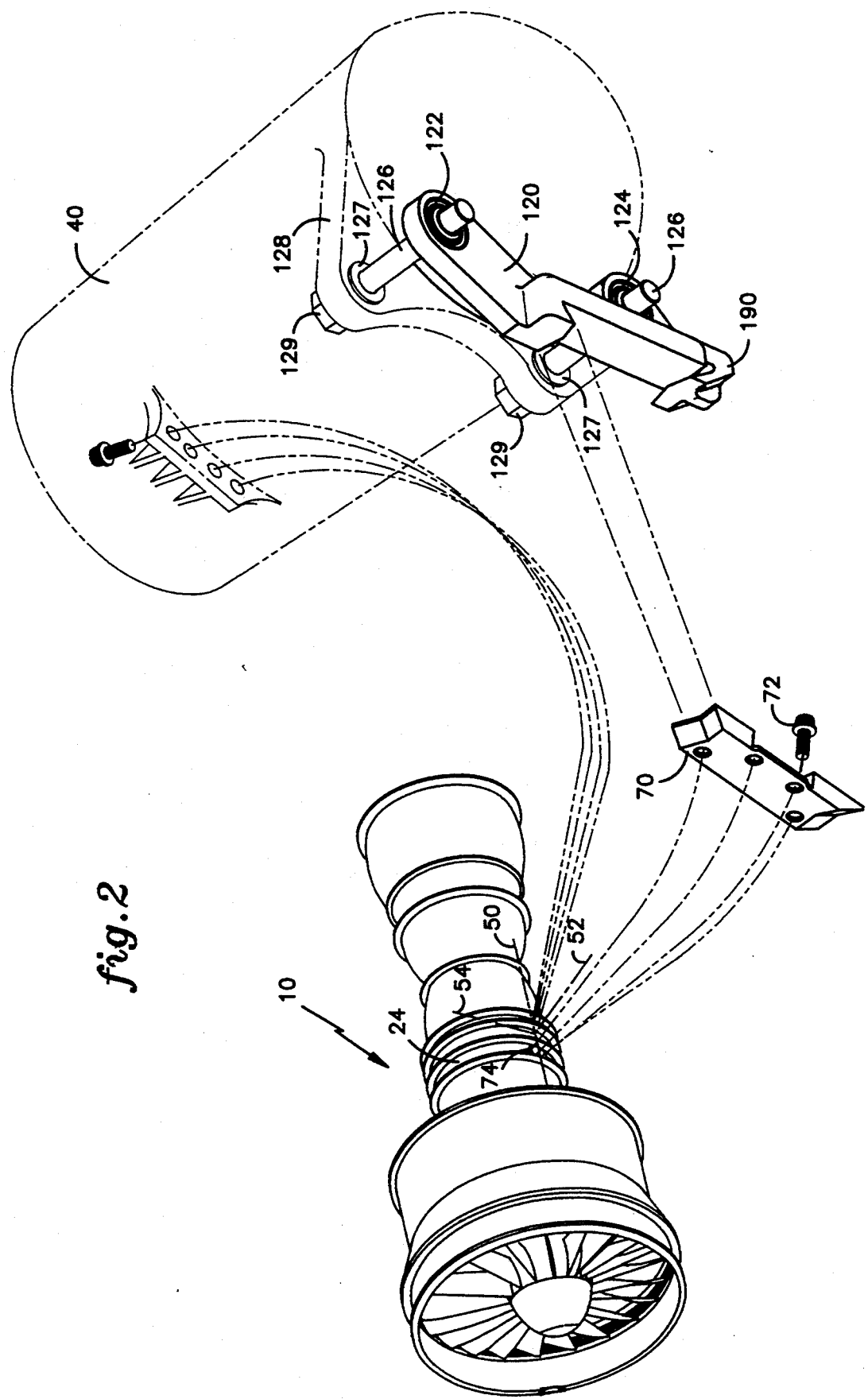

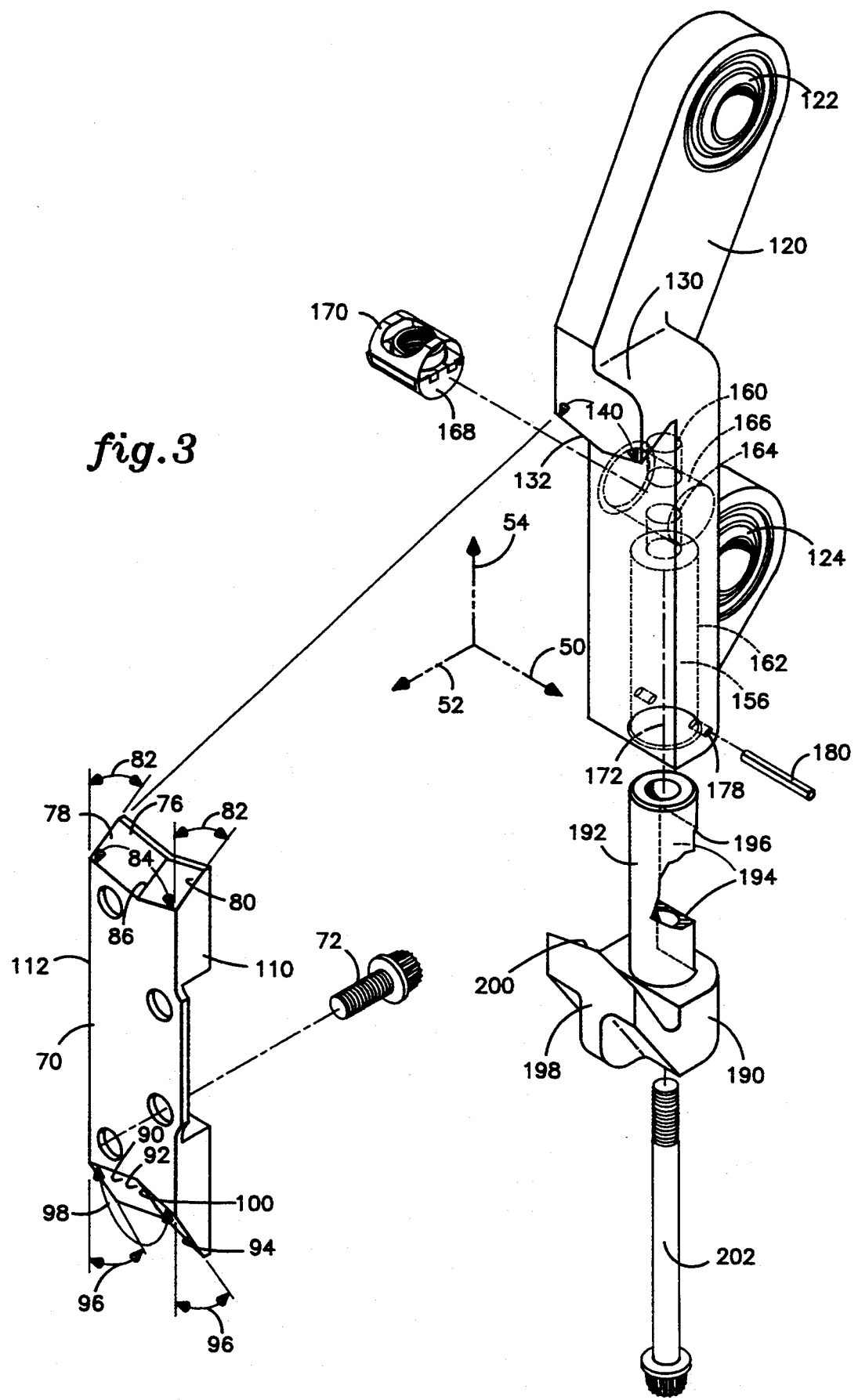

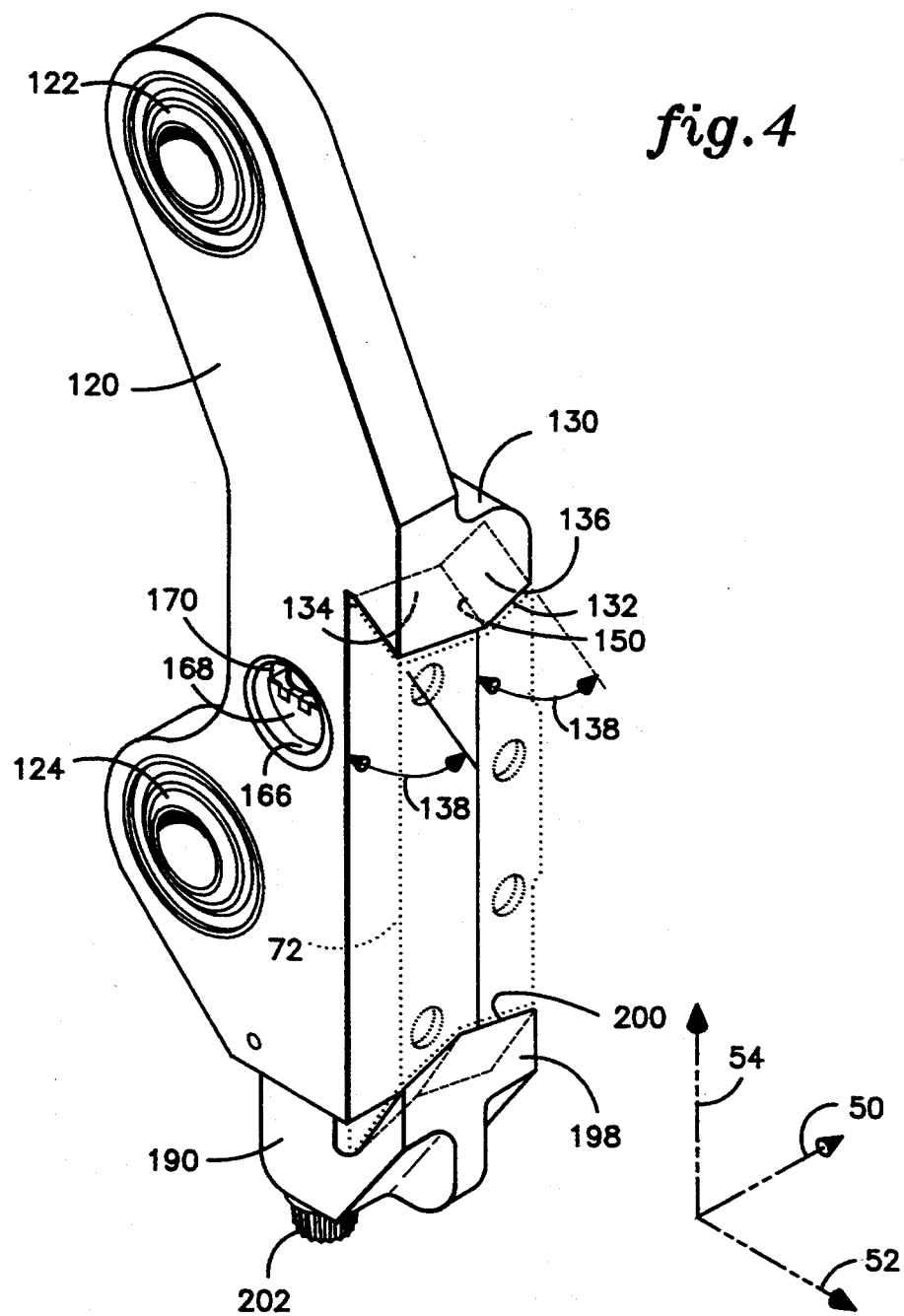

MOUNTING BRACKET FOR AN AIRCRAFT ENGINE ACCESSORY

TECHNICAL FIELD

This invention relates to an arrangement for mounting accessories on the case of an aircraft engine, and more particularly to a bracket which simplifies the mounting and dismounting of an accessory and protects the accessory from the detrimental effects of case deflection and distortion.

BACKGROUND OF THE INVENTION

Modern gas turbine aircraft engines have a variety of accessories mounted on their external cases. Examples of external accessories include control systems for regulating the engine's operation, heat exchangers for cooling oil or heating fuel, and pumps for circulating fluids.

Various arrangements of hardware are used to mount an accessory on an engine. For example, an accessory may include brackets which are fastened to engine case flanges by bolts extending through holes in both the brackets and the flanges. The accessory is mounted on the engine by manually positioning the accessory so that the bracket holes are in close proximity to and in alignment with the corresponding case flange holes. While the accessory is held in position, bolts are passed through the bracket and case flange holes. The bolts are secured by nuts to connect the accessory to the engine.

Alternative mounting arrangements in which a fastening means, such as the nuts and bolts of the foregoing example, is engaged while the accessory is manually held in position are also possible. Such mounting arrangements may be effective for compact, light weight accessories. Many accessories, however, are unwieldy due to their bulk and weight. A mechanic attempting to mount such an accessory may need both hands to position the accessory, leaving neither hand free to fasten the accessory to the engine. An attempt to maintain the accessory in proper position with one hand may result in the accessory shifting out of position or possibly being dropped and damaged. The difficulties of mounting a heavy or bulky accessory are further exacerbated if the accessory is to be mounted in a difficult to reach location on the engine case or if the fastening means is difficult to reach once the accessory is properly positioned.

It is also desirable to minimize the quantity of loose parts associated with any accessory mounting arrangement. A loose part, such as a bolt or nut, can easily be lost or misplaced. Far from being a mere inconvenience, loose parts can be ingested into turbine engines causing considerable engine damage.

It may also be desirable to protect such a case mounted accessory from the potentially detrimental effects of case deflection or distortion caused by structural loads acting on the case or by case temperature nonuniformities. Externally mounted accessories are often connected to the engine case at two or more locations along the length of the engine. During engine operation, the internal temperature of the engine is different at different positions along the engine's length so that the case expands and contracts by unequal amounts at each mounting location. If an accessory is connected to the engine by a hard mount (that is, a connection which is essentially inflexible and immobile such that case deflections are transmitted to the accessory) the differences in the amount of radial expansion or contraction of the case at each of the mounting locations bends the accessory, the mounting hardware or both and imposes undesirable stress on the mounting hardware or on the accessory itself. Accordingly, it is known to use a floating mount, rather than a hard mount, at one or more of the mounting locations. A floating mount is a connection having some flexibility or mobility so that the accessory is protected from case deflections and distortions.

In view of the difficulty of mounting and dismounting an external accessory, the undesirability of loose parts, and the benefits of protecting an accessory from engine case deflection and distortions, a mount arrangement which simplifies the mounting and dismounting of the accessory, has no loose parts and offers protection from case deflections and distortions is sought.

DISCLOSURE OF THE INVENTION

It is an object of the present invention to simplify the installation of an engine accessory with a bracket capable of both permanently connecting the accessory to the engine and temporarily supporting the accessory during its installation.

Another object of the invention is to minimize the quantity of loose parts associated with an accessory mounting arrangement.

Still another object of the invention is to protect an accessory from the undesirable effects of case deflections and distortions such as those arising from unequal thermal growth of the engine case at each of two or more accessory mounting locations.

According to the present invention, a bracket for mounting an accessory on an aircraft engine includes a mounting wedge adapted to be secured to the engine, a carrier which is supported by the mounting wedge and in turn supports an end of the accessory, and a lock which is retained by the carrier and which can be closed and secured to clamp the carrier to the mounting wedge and can be opened to mount the carrier on the wedge or dismount the carrier from the wedge.

The mounting wedge has a supporting surface and a clamping surface, each of which is inclined at an acute angle to the engine. An inclined mounting surface on the carrier abuts the supporting surface on the mounting wedge so that the carrier (and therefore the end of the accessory supported by the carrier) is supported by the mounting wedge. In addition to being inclined, the supporting and mounting surfaces are notched and ridged respectively to center and support the carrier laterally on the mounting wedge. The lock, which is retained by the carrier, is translatable with respect thereto between open and closed positions. When the lock is translated to an open position, the carrier can be mounted on or dismounted from the mounting wedge. When the lock is translated to and secured in its closed position, an inclined locking surface on the lock abuts the inclined clamping surface on the mounting wedge to clamp the carrier to the mounting wedge. The locking and clamping surfaces, like the mounting and supporting surfaces, are ridged and notched respectively to center and laterally support the carrier.

Because of the notched, inclined supporting surface on the wedge and the corresponding ridged, inclined mounting surface on the carrier, a mechanic installing an accessory on an engine can rest the carrier on the mounting wedge with confidence that the carrier (and the end of the accessory supported thereby) is temporarily but adequately supported on the engine. The mechanic's hands are thus free to support and position the other end of the accessory and fasten it to the engine. Installation of the accessory is completed by translating the lock to its closed position and securing the lock.

In one embodiment of the invention, the lock is secured in its closed position by a bolt which extends longitudinally through the lock and threads into a nut positioned in the carrier.

In another embodiment the carrier includes at least one spherical bearing for supporting the accessory. The spherical bearing protects the accessory from the adverse effects of engine case deflections and distortions.

The foregoing features and objects and the operation and construction of the invention will become more apparent in light of the following description of the best mode for carrying out the invention and the accompanying drawings.

BRIEF DESCRIPTION OF THE DRAWINGS

FIG. 2 is a schematic perspective view of a gas turbine engine, an accessory to be mounted on the engine's case, and the mounting bracket of the present invention (shown partially exploded) as used to connect the forward end of the accessory to the engine case.

FIG. 3 is an exploded, perspective view of the mounting bracket of the present invention.

FIG. 4 is an assembled, perspective view of the mounting bracket of the present invention rotated ninety degrees with respect to the view of FIG. 3. Light lines are used to depict the mounting wedge of the bracket so that features of the remaining portions of the bracket are not obscured.

BEST MODE FOR CARRYING OUT THE INVENTION

Figure 1:
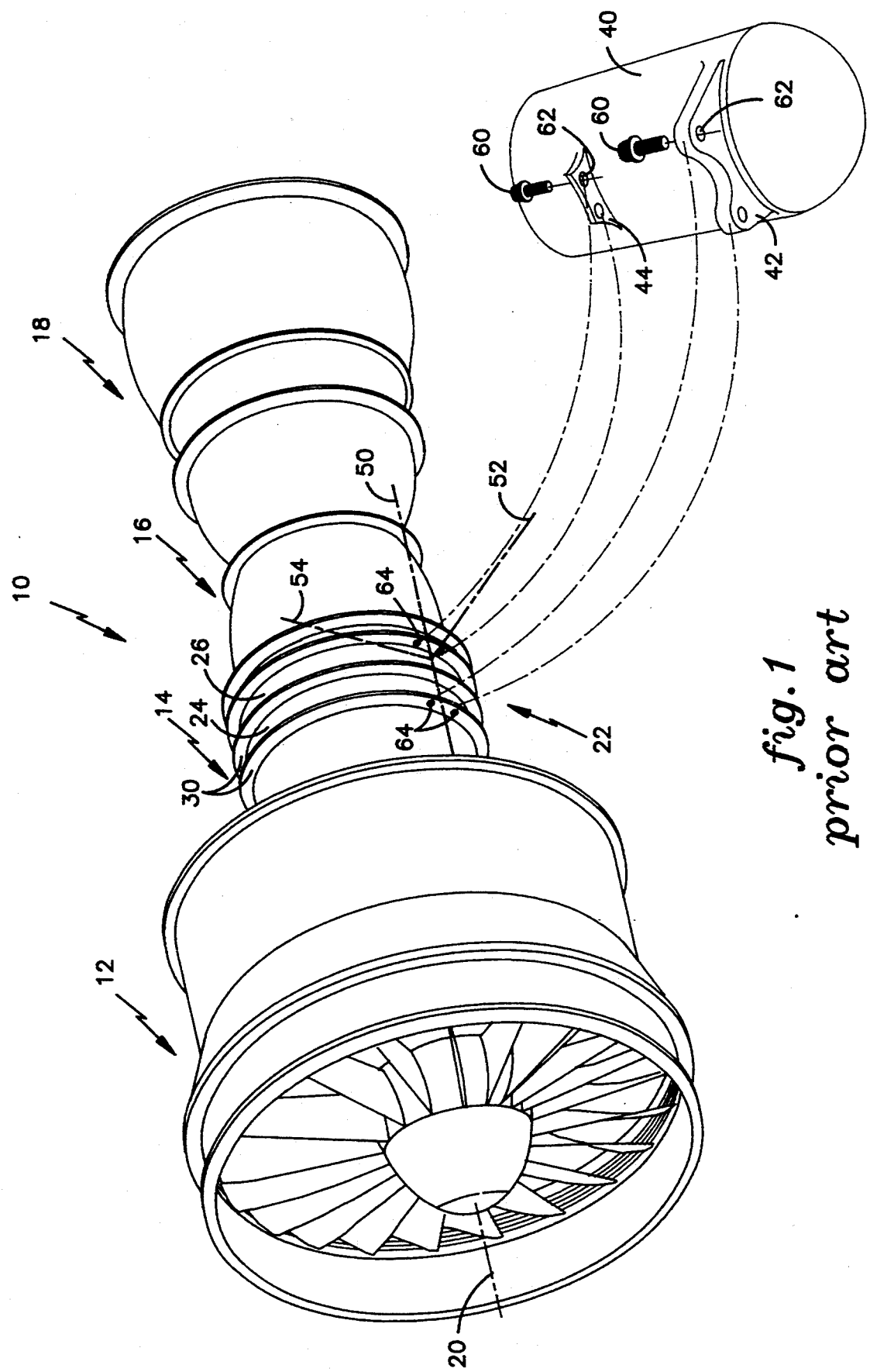
FIG. 1 is a schematic perspective view of a gas turbine engine and an accessory to be mounted on the engine's external case.

Referring to FIG. 1, a gas turbine engine 10 includes as its principal components a fan section 12, a compression section 14, a combustion section 16 and a turbine section 18. The compression and turbine sections each contain one or more compressors and turbines (not shown) which rotate about a central rotational axis 20. The principal components are circumscribed by an essentially cylindrical external case 22 which serves as a structural backbone for the engine. The external case is usually constructed of individual cases, such as cases 24 and 26, which are joined together at bolted flanges such as flange 30.

Modern engines employ a variety of accessories which are frequently mounted on the engine's external case. For example, FIG. 1 schematically illustrates a heat exchanger 40 which cools engine lubricating oil by transferring its heat energy to the engine's fuel supply, and therefore is commonly referred to as a fuel/oil cooler. The cooler is mounted to the external case by mounts 42, 44 shown schematically in FIG. 1. The mounts may be hard mounts which connect the cooler to the engine case by an essentially inflexible, immobile connection that transmits case deflections and distortions to the accessory. Alternatively, one or more of the mounts may be a floating mount which is a joint having enough flexibility or mobility to protect the cooler from case deflections and distortions.

FIG. 1 illustrates only a single accessory, the fuel/oil cooler, connected to the engine. However it should be appreciated that a typical modern engine has a multitude of externally mounted accessories as well as externally mounted electrical, pneumatic and hydraulic lines. Consequently, accessories may be inconveniently located and hard to reach which makes their installation and removal difficult and time consuming.

FIG. 1 also shows a set of mutually perpendicular axes to provide a convenient frame of directional reference. Axis 50 is parallel to the central rotational axis and defines the lateral direction. Axes 52 and 54 both lie in a plane perpendicular to the rotational axis. Axis 52 extends radially outward from the rotational axis and defines the radial direction while axis 54 defines the longitudinal direction.

With many prior art mounting arrangements, an accessory to be mounted on an engine is manually positioned near its intended location on the engine case so that the means used to connect the accessory to the engine can be engaged and secured. For example, the cooler of FIG. 1 is illustrated as being connected to an engine by bolts 60 which pass through bolt holes 62 in the cooler and corresponding bolt holes 64 in one or more engine case flanges (or in brackets attached to the cooler and flanges). To install the cooler, a mechanic manually positions the cooler so that the bolt holes in the cooler and those in the flange are in close proximity and in nearly perfect alignment. The bolts are then inserted through the holes and secured by nuts to connect the cooler to the engine. Since the cooler is heavy and bulky, as many engine accessories are, the mechanic needs both hands to position the cooler, leaving neither hand free to install the bolts. An attempt to hold the cooler with one hand can result in the cooler shifting out of position or being dropped and damaged. The difficulty of installation is compounded if the cooler is to be mounted in a difficult to reach location or if the bolt holes themselves are difficult to reach.

The mounting bracket of the present invention alleviates the difficulties associated with mounting arrangements whose use requires manually holding an accessory at its installed location, and in its installed orientation, while simultaneously engaging the means required to effect a permanent connection.

Referring to FIGS. 2, 3 and 4, a mounting wedge 70 is secured by bolts such as bolt 72 to a mounting pad 74, which is a locally flat surface on the engine case 24. The wedge has a supporting surface 76 defined by a pair of facets 78 and 80. Each facet is inclined at an acute inclination angle 82 with respect to the engine (that is with respect to a plane parallel to the plane of the lateral and longitudinal axes 50, 54), the inclination angle being measured in a plane perpendicular to the lateral axis 50. The facets are also canted with respect to each other so that they form a facet angle 84 measured in a plane perpendicular to the radial axis 52. The facets intersect to form a notch 86. The mounting wedge also has a clamping surface 90 which, like the mounting surface, is defined by two facets 92, 94 inclined by acute inclination angle 96 and canted with respect to each other by facet angle 98 to form notch 100. In the illustrated embodiment, inclination angles 82, 96 are equal to each other and facet angles 84, 98 are also equal to each other. Notches 86, 100 are closer, by the same amount, to the aft lateral extremity 110 of the wedge than to the forward lateral extremity 112. However inclination angle 82 may be unequal to inclination angle 96 and facet angle 84 may be unequal to facet angle 98. Moreover the lateral location of notch 86, may be different than that of notch 100 and each notch may be equidistant or nonequidistant from the wedge lateral extremities.

A carrier 120 includes spherical bearings 122, 124, integral with the carrier for supporting an end of a fuel/oil cooler 40 or other accessory. As described more completely hereinafter, one end of the cooler (FIG. 2) is connected to the carrier by accessory mount pins 126 which pass through both the spherical bearings and a lug 128 which is integral with the cooler and located near one end thereof. The carrier also includes an integral fixed jaw 130 having a mounting surface 132. As best seen in FIG. 4, the mounting surface is defined by a pair of facets 134, 136 which are inclined by inclination angle 138 and canted by facet angle 140 (FIG. 4). The facets meet to form a ridge 150. The inclination and facet angles of the mounting surface are equal to the inclination and facet angles 82, 84 respectively of the supporting surface 76 of the wedge. The inclined, ridged mounting surface on the carrier abuttingly mates with the inclined, notched supporting surface on the wedge so that the wedge supports the carrier and therefore the cooler. The cooperating inclinations of the mounting and supporting surfaces prevent radial displacement of the cooler relative to the wedge while the notch 86 mates with the ridge 150 to center the carrier laterally on the wedge and resist lateral displacement of the carrier.

The carrier also has a cylinder 156 extending longitudinally therein. The cylinder extends from the end of the carrier opposite the fixed jaw 130 and has a terminus 160 in the interior of the carrier. A longitudinally outer portion 162 of the cylinder has a diameter which is greater than the diameter of a longitudinally inner portion 164 of the cylinder. The carrier also has a laterally extending cylindrical socket 166 which intersects the inner portion of the cylinder. A barrel nut 168 is positioned in the carrier at the intersection of the cylinder and the socket. A sheet metal retaining spring 170 presses the barrel nut against the curved interior surface of the socket to prevent the nut from slipping out of the socket. The curved interior surface of the socket cooperates with the a curved exterior surface of the barrel nut to prevent the nut from rotating about the cylinder's longitudinal axis 172. Because the nut is positioned in the relatively small diameter inner portion of the cylinder, rather than in the larger diameter portion, the bearing surface area for the nut is maximized.

A laterally extending hole 178 in the carrier intersects the larger diameter portion of cylinder 156 and contains a spring pin 180 whose function is described more completely hereinafter. The spring pin presses tightly against the interior surface of the hole so that the spring pin cannot be readily dislodged from the hole.

The bracket of the present invention also includes a lock 190 having an essentially tubular stem 192. A planar surface 194 extends along a portion of the stem to define a shoulder 196. As best seen in FIG. 4, the lock also includes a locking jaw 198, integral with the stem and having a locking surface 200. The locking surface is inclined and ridged to abuttingly mate with the clamping surface 90 on the mounting wedge (similar to the manner in which the mounting surface is inclined and ridged to mate with the inclined, notched supporting surface). The stem is received in and retained by the longitudinal cylinder 156 of the carrier so that the lock is longitudinally translatable with respect to the carrier between a closed position and a range of open positions. The closed position is the position, illustrated in FIG. 4, at which the lock's locking surface abuts the clamping surface of the wedge. An open position is any position of the lock at which the clamping and locking surfaces are sufficiently separated to permit dismounting of the carrier from the wedge. The planar surface 194 on the stem cooperates with the spring pin 180 to prevent rotation of the lock about the cylinder's longitudinal axis 172 thereby keeping the locking jaw in line with the fixed jaw 130 on the carrier. A bolt 202 extends longitudinally through the stem and threads into barrel nut 168 to couple the lock to the carrier. When the lock is translated to its closed position, the locking surface of the lock abuts the clamping surface of the wedge. Tightening the bolt 202 clamps the carrier to the wedge to permanently mount the accessory to the engine.

The present invention simplifies the mounting of the heavy, bulky cooler by temporarily supporting the cooler prior to the cooler being permanently connected to the engine. The mounting wedge 70 is secured to the engine case 24 by bolts 72 and is normally left in place during subsequent installation or removal of the cooler. Mount pins 126 (FIG. 2) are affixed to the cooler mounting lug 128 by the clamping action of a shoulder 127 on each pin and a nut 129 threaded onto one end of each pin. Before the cooler is positioned near the engine case, the carrier is placed on the mount pins so that the pins project through the spherical bearings 122, 124. The fit between the mount pins and the bearings is tight enough that the carrier does not slide off the pins if the accessory is tilted while being lifted into position. The fit is also loose enough that sliding between the bearings and the pins may occur during engine operation. Such sliding can occur due to thermal expansion of the engine in the direction of the rotational axis 20 (FIG. 1).

With the carrier in place on the accessory mount pins and the lock in an open position, the accessory is lifted into position so that the mounting surface 132 on the carrier is mounted on and supported by the supporting surface on the mounting wedge. Because the surfaces are canted and inclined, they help guide the carrier onto the wedge, center the carrier on the wedge, support the carrier radially and restrain the carrier laterally. With the carrier, and therefore a first end of the cooler, thus temporarily supported on the mounting wedge, the other end of the cooler is connected to the engine case. FIG. 2 implies that the other end is mounted by a hard mounting arrangement, however any suitable mounting arrangement, including that of the present invention, may be used.

With the first end of the cooler temporarily supported on the mounting wedge and the other end mounted to the case, the lock 140 is translated to its closed position where, as best seen in FIG. 4, the locking surface 200 of the lock abuts the clamping surface 90 of the wedge. Bolt 202 is tightened into nut 168 to clamp the carrier to the mounting wedge, thereby forming a permanent connection therebetween.

The cooler is dismounted in the reverse order of mounting. Bolt 202 is released by loosening it so that the lock is translatable to an open position, that is, to a position such that the mounting surface 132 on the carrier and the locking surface 200 on the lock are sufficiently separated that the carrier is dismountable from the mounting wedge. In the illustrated embodiment, sufficient separation exists with the lock stem 192 not completely withdrawn from the cylinder 156 in the carrier and with bolt 202 still threaded into nut 168 so that the lock remains coupled to the carrier. Accordingly, there are no loose parts associated with the mounting bracket of the present invention. Once the lock is translated to an open position, the wedge continues to support one end of the cooler. The other end of the cooler is disconnected from its mount with confidence that the first end is temporarily but reliably supported by the mounting wedge. Finally, the first end of the cooler, with the carrier still in place on the accessory mount pins, is dismounted from the mounting wedge to complete the removal of the cooler from the engine.

If desired, bolt 202 can be completely unthreaded from nut 168. With the bolt removed, the lock is translatable to an open position at which the shoulder 196 on the lock stem 192 bears against the spring pin 180 to prevent complete withdrawal of the stem from cylinder 156 thereby minimizing the quantity of loose parts. The spring pin may be driven out of hole 178 with suitable tools to permit complete withdrawal of the lock if desired.

The bearings 122, 124 in the carrier have been described as spherical bearings. Such bearings are a mobile connection since they are pivotable about longitudinal, lateral and radial axes. The pivotability precludes deflections or distortions of the engine case from being transferred to the cooler. However other types of bearings, for example a simple bushing, can be used. A simple bushing, however, is immobile and its use is appropriate only in applications where it is unnecessary to protect an accessory from distortions.

The bracket of the present invention has been described in the context of mounting one end of a fuel oil cooler so that the cooler is protected against the adverse affects of unequal thermal expansion of an engine case. Of course, the bracket can be used for other types of accessories and multiple brackets can be used to mount an accessory at multiple mounting locations. Moreover, the invention protects the accessory from case deflections and distortions arising from various causes, not just those associated with thermal growth inequalities.

We claim:

1. A bracket for mounting an accessory on an aircraft engine, characterized by:
   a mounting wedge adapted to be secured to said engine and having a notched supporting surface and a notched clamping surface, each of said surfaces being inclined at an acute angle to said engine;
   a carrier including at least one bearing integral therewith for supporting an end of said accessory, said carrier also including an integral fixed jaw, said fixed jaw having a mounting surface abutting said supporting surface whereby said carrier is supported by said mounting wedge;
   a lock retained by said carrier and longitudinally translatable with respect thereto between a closed position and a range of open positions, said lock including a locking jaw having a locking surface abutting said clamping surface when said lock is at said closed position and longitudinally spaced from said clamping surface when said lock is at said range of open positions so that said carrier is dismountable from said mounting wedge; and
   means for coupling said lock to said carrier and for securing said lock in said closed position so that said carrier is clamped to said mounting wedge, said coupling and securing means being releaseable so that said lock is translatable to said range of open positions.

2. The bracket of claim 1 further characterized in that said at least one bearing is a spherical bearing.

3. The bracket of claim 1 further characterized in that said coupling and securing means comprises a nut nonrotatably positioned in said carrier and a bolt extending longitudinally through said lock and threaded into said nut for coupling said lock to said carrier.

4. A bracket for mounting an accessory on an aircraft engine, characterized by:
   a mounting wedge adapted to be secured to said engine and having a notched supporting surface and a notched clamping surface, each of said surfaces being inclined at an acute angle to said engine;
   a carrier having a cylinder extending longitudinally therein comprising:
      at least one spherical bearing integral with said carrier for supporting an end of said accessory,
      a fixed jaw, also integral with said carrier, having a mounting surface abutting said supporting surface whereby said carrier is supported by said mounting wedge, and
   a nut nonrotatably positioned in said carrier;
   a lock comprising:
      an essentially tubular stem received in and retained by said longitudinal cylinder and translatable with respect to said carrier between a closed position and a range of open positions, a portion of said stem having a planar surface defining a shoulder, and a locking jaw integral with said stem and having a locking surface abutting said clamping surface when said lock is at said closed position, and longitudinally spaced from said clamping surface when said lock is at said range of open positions so that said carrier is dismountable from said mounting wedge;
      a bolt extending through said stem and threaded into said nut for coupling said lock to said carrier and whereby said carrier is clamped to said mounting wedge upon tightening of said bolt and said lock is translatable to said range of open positions upon loosening of said bolt; and
      a spring pin disposed in said longitudinal cylinder so that said shoulder rests against said pin upon removal of said bolt to prevent withdrawal of said lock from said cylinder, said pin also cooperating with the planar surface of said stem to resist rotation of said lock with respect to said carrier.

* * * * *